Patented June 7, 1938

2,120,124

UNITED STATES PATENT OFFICE 2,120,124

OIL COMPOSITIONS

William H. Butler, Palisades Park, N. J., assignor to Bakelite Corporation, New York, N. Y., a corporation of Delaware No Drawing. Application December 22, 1936, Serial No. 117,149

12 Claims. (Cl. 134—26)

The present invention relates to oil compositions modified by the addition of resins of the phenolic type.

The problem of preparing oil compositions in which phenolic resins are included has occupied the attention of many since the time of Berend's patents which were granted as early as 1916 (see Patents Nos. 1,191,390 and 1,205,081); according to these patents a phenolic resin is modified by the addition of rosin or other natural resin in sufficient amount, i. e. in major proportion, such that the resin becomes oil-soluble but characteristic properties of the phenolic resin, such as hardening under the action of heat, become destroyed and the modified resin acts like a novolak in that it no longer sets up under the action of heat. Novolak resins, by which are meant resins which do not set up or harden under the action of heat to form useful products, are in general oil-soluble if run in oil at varnish cooking temperatures of 500–600° F. The resins and crystalline bodies of the saliretin type formed by the reaction of a phenol with sufficient alkali to form a material amount of a phenate and this in turn reacted with formaldehyde (generally in large excess over molecular proportions) at low temperatures are known to be oil soluble. Substituted phenols with three or more carbon atoms in the ring substituents form resins with formaldehyde which can be brought into solution with fatty oils without adding modifying agents, and the greater the number of carbon atoms in the radicals substituted for the hydrogen of the phenol ring the more readily do the resins prepared from them go into solution with fatty oils; the heat-hardening property of such resins when made under usual operating conditions is, however, in inverse ratio to the solubility in oils, and the higher substituted phenols by the procedure commonly followed give resins which for practical purposes are not heat-hardening in oils.

For association with oil-soluble resins of the phenolic type, as described above, drying and semi-drying fatty oils have been used. In particular those resins made from substituted phenols and without modification by rosin or other natural resins markedly improve the character of films deposited by oil compositions containing them both as to speed of drying and as to alkali resistance; this action is believed due to an accelerating effect of the resin on the polymerization of drying oils. For example, coating compositions have been prepared from substituted phenol resins and drying oils which dry and harden in from 1 to 4 hours to a film resistant to alkalies, whereas comparable coating compositions without the addition of unmodified phenolic resins require about twice the time to dry to print-free films and then the films are not as resistant to alkalies.

Rapidity of drying of fatty oils can be promoted by blowing or oxidizing the oils. Oxidized or blown oils are usually prepared by passing a stream of air through a drying oil at temperatures above 150° C. giving heavy liquids with viscosities ranging from 1500 k. v. to 12,500 k. v. Blown oil films still require from four to five days unless driers are included when they can be so speeded up as to dry or become "case hardened" in from 18 to 20 hrs. Driers, however, cause a surface drying or hardening of films and do not materially accelerate hardening or gelation beneath the surface to set the oil to a firm, homogeneous, rigid gel throughout its entire mass.

A blown or oxidized oil can be heated at elevated temperatures to bring about an increase in viscosity and cause a certain amount of surface skinning; yet no appreciable gelation takes place. For instance, blown fish oil and blown linseed oil after heating in bulk for 16 hours at 135° C. remained heavy viscous liquids when cooled to room temperature.

According to the present invention blown or oxidized oils can be rapidly polymerized to rubber-like solids in any thickness, and a distinguishing characteristic of such gelled products is that they are firm resistant masses, exhibiting no surface or case hardening but having a uniform hardness throughout. This is accomplished by including in the blown oils phenolic resins which are oil-soluble and in addition have a reactivity under the action of heat such that they set up or harden from a fusible or meltable state to a state where they do not melt but may soften without flowing within one to ten minutes and preferably within two to five minutes at 160° C.; a resin can be tested by spreading a small portion as a film on a plate heated to 160° C. and noting the time interval required for hardening.

The preparation of the resins suitable for this invention are found to depend upon the use of basic substances limited in amount to catalytic proportions (one-fifth of a mol. or less based on the phenol) and preferably in amounts not greater than 2 parts by weight of ammonium hydroxide (or equivalent amounts of other bases) for each 100 parts of the phenol; the basic substances serve to direct the reaction between the phenol with formaldehyde or equivalent methylene-containing agent added in equimolecular or greater proportions. For oil-solubility, the ortho or para alkyl or aryl substituted phenols or their mixtures or high boiling tar acid mixtures containing such phenols are used in preparing the resins. The resin-forming reaction is carried to a point where the resins are hard or brittle when cold and have a melting point at or above 50° C.

In order to prepare compositions of resin and blown oil converted to highly polymerized, rubber-like solids, it is preferred to disperse the resin, while still in the fusible state, into the blown oil and then heat the oil-resin dispersion at a temperature of about 100–150° C. for about 2 to 4 hours, when the composition will have set to a soft rubbery gel; the heating may be continued until the composition is converted into a dry soft gel. This procedure can be varied particularly to hasten the gelation of resin-blown oil composition, by first heating the blown oil to somewhat higher temperature of 150 to 260° C. for from 30 to 60 minutes, then dispersing the heat-reactive resin in the hot oil and continuing the heating for 10 to 20 minutes more; this will usually be sufficient to convert the resin-blown oil composition to a rubbery, viscous mass but of a consistency permitting the incorporation of fillers and pigments.

The proportions of resin and oil can be varied within rather wide limits, for as little as one part of resin in 20 parts of blown oil having been found to be useful in accelerating the polymerization of the oil; the maximum amount of resin usually used is 2 parts of resin to 1 of oil. The rapidity at which the composition will gel or set up depends both on the nature of the resin and of the oil. Thus, a resin which can be converted to the non-melting state, say in five minutes at 160° C., will have a greater accelerating effect than a resin which is converted to the non-melting state in 10 minutes at the same temperature; in general, however, those resins which can be converted to the non-melting state within less than 10 minutes at 160° C. have proven the most satisfactory.

Practically any blown oil can be converted into tough, rubbery-like gels when heated with these reactive resins, although the rapidity of their conversion to the gel state varies with the different oils and the processing to which they have been subjected. Thus, the polymerization of a composition of blown tung oil and resin as herein defined can be accelerated to such an extent by the action of the resins that it solidifies to a soft gel, even at room temperature. The gelled tung oil and resin composition remains comparatively soft, however, even when heated; whereas a gelled blown fish oil-resin composition has greater firmness and mechanical strength.

Using 50 parts of a heat-reactive resin prepared from high boiling tar acid and formaldehyde and 50 parts of blown oil, the gelation rate of a number of different oils has been determined by measuring the hardness of the resulting gels obtained by heating the oil-resin composition for 2 hours at 80° C. and then 2 hours more at 122° C. The results are shown in the following table:

| Oil | Shore hardness | |
|---|---|---|
| 1. Blown fish oil | 85 | Firm, hard gel. |
| 2. Linseed oil | 70 | Firm gel. |
| 3. Soya bean oil | 70 | Do. |
| 4. China-wood oil | 35 | Do. |

For comparison, a similar experiment was conducted but substituting in one case a natural resin ester and in another a non-heat-reactive oil-soluble phenol-formaldehyde resin for the heat-reactive oil-soluble resin; in both cases no gelation of the oil was obtained and the Shore hardness, as determined, was 0, the compositions being not gels but viscous liquids at room temperature. Duprene rubber has a Shore hardness of about 75.

Blown fish oil and blown linseed oil are the oils preferred, since the firm gelled compositions obtained on heating them in composition with a heat-reactive resin as defined are better adapted for use in molding compositions, for calendering masses, in floor covering compositions, etc.; that is, in uses which require composition masses of considerable thickness.

The gelation of the blown oil-resin composition can be arrested by the addition of appropriate thinners, and in this way dispersions are obtained of reactive blown oil-resin compositions which are suitable for impregnating compounds, wire coating compositions, etc. Such dispersions are generally highly reactive and deposit thick films which gel rapidly throughout their entire mass and which are free of any surface skinning or hardening. Driers or other oxidation accelerating agents are not required, since these films dry by virtue of the polymerization accelerating effect imparted by the heat-reactive resin. This permits the application of films of considerable thickness (over .002") which dry uniformly and thus effect considerable saving in time, since very often a coating of the requisite thickness to give complete protection can be applied in one operation whereas several coats of the conventional drying oil-resin compositions are usually necessary. The thick films of blown oil-resin composition may be subjected to a baking operation if a coating of greater stability and resistance is desired; moreover, such baked films will be of uniform hardness and resistance throughout their mass. Due to this uniformity of hardening, it is possible to bake films of greater thickness than is ordinarily the case and yet avoid any tendency to blistering, case hardening, wrinkling or like difficulties such as are normally encountered when thick coatings of the ordinary oil varnishes are applied.

It has also been found that in many cases it is not necessary to heat the blown oil and reactive resin together; instead, it is sufficient to subject the blown or oxidized oils to a preliminary heat treatment, for example, 1 hour at 250 to 300° C., and then cold blend with such heat treated oils a solution of heat-reactive resin in a suitable solvent such as toluol or xylol. The resulting solution can be used either for coating or impregnating and deposits on evaporation of the solvent a thick film of heat-reactive resin dispersed in heat treated blown oil, which can be completely hardened throughout its mass by heating for 1 to 2 hours at 100 to 125° C. This heating step may in certain cases be omitted and it is feasible to effect a gelatin of the heat-reactive resin-blown oil compositions even at room temperature. This is particularly true if the oil used is blown China-wood oil. In this case it has been found that by allowing a solution of a simple mixture of a heat-reactive resin with the blown China-wood oil to stand at room temperature for a few hours, a gelled composition will result.

In order to more clearly indicate the type of materials obtained by the incorporation of heat-reactive resin with blown or oxidized oils, the following typical examples are given.

*Example 1.*—100 parts of high boiling phenolic compound, of which about 25% has a boiling point range of 225 to 235° C., 30% a range of 235 to 240° C., and 45% a range of 240 to 250° C., is reacted under a reflux with 100 parts of formaldehyde, 37% solution, and 1 part of hexamethylenetetramine for 3 hours at atmospheric pressure. The resin layer is separated and dehydrated by heating to a temperature of 110° C. in approximately 1 hour at 100 mm. pressure. The resulting resin is brittle, light amber in color, softens between 50–100° C. and can be polymerized in a layer one mil thick to a state in 50–400 seconds where it does not soften at or below 160° C.

To 200 parts of blown soya bean oil heated to 150° C. and the heat then removed, are added 100 parts of resin prepared as above described. The addition of resin causes the temperature to drop to about 100° C. in 3 minutes and this temperature is maintained for about another 10 minutes. The resulting composition is a viscous liquid, having a viscosity of about 1000 k. v., it is heat-reactive and it can be further polymerized to a firm gel by heating for 2 hours at 135° C. Thinned with appropriate solvents it may be used as an impregnating varnish or as a wire enamel. This type of coating, after baking, has improved resistance to solvents such as mineral spirits and aromatic hydrocarbons.

*Example 2.*—200 parts of blown linseed oil are brought to a temperature of 260° C. in 40 minutes and held at this temperature five minutes. The partially polymerized blown oil is then cooled to 100° C., 100 parts of resin prepared as in Example 1 are then added, and the resin-oil composition is held 10 to 15 minutes at 100° C. The resulting viscous liquid composition, having a viscosity of about 2000 k. v., is heat-reactive. It may be further polymerized if desired, to a firm gel by heating for 1 hour at 135° C., the polymerization proceeding uniformly throughout the mass without wet spots or surface skinning. For coil impregnation and the like it may be thinned with appropriate solvents such as mineral spirits, aromatic hydrocarbons and the like.

*Example 3.*—500 parts of blown linseed oil are brought to a temperature of 260° C. in 40 minutes and held at this temperature for 25 minutes. The partially polymerized blown oil is then combined with 100 parts of resin made according to Example 1. The resulting viscous composition, having a viscosity of about 600 k. v., polymerizes to a soft gel when heated 3 to 5 hours at 135° C. It may be used as an impregnating compound for brake lining and the like, either with or without the addition of thinners.

*Example 4.*—100 parts of an oil soluble heat-hardenable phenolic resin made according to Example 1 is dissolved in 60 parts of toluol; 100 parts of blown China-wood oil are then mixed with the resin solution at 20 to 25° C. Such a resin-oil composition will gradually polymerize to a solid over a period of three to five hours at a temperature of 24–30° C.

Another composition, in which 3 parts of blown China-wood oil and 1 part of heat-reactive resin are admixed at a low temperature, is sufficiently liquid to be cast into a mold, as for example, a mold for a printing roll. When baked at 100° C. for about 4 hours a soft rubbery composition, resistant to gasoline and water, is obtained which proves satisfactory as a printing roll.

*Example 5.*—100 parts of para tertiary amyl phenol is reacted with 150 parts formaldehyde, 37% solution, under a reflux with 10 parts of 20% caustic solution for approximately 1 hour. The reaction mixture is cooled, acidified with dilute sulphuric acid and the resin layer extracted with toluene. The resin solution is then washed, the toluene distilled off, and the resulting product is a light colored, hard, brittle, oil-soluble and heat-hardenable resin that is of slower reactivity than the resin of Example 1 and softens at about 80° C. It can be compounded with blown oil, for instance by kneading 150 parts of blown linseed oil, 150 parts of blown fish oil and 100 parts of the resin together at a temperature of 120 to 160° C. for about 3 hours or until the composition polymerizes to a soft rubbery gel. At this point inert fillers or pigments can be added—say about 1 part filler to 4 parts blown oil-resin composition—and the heating is continued at 120 to 160° C. for 3 hours or until the composition is converted to dry rubbery mass which can be sheeted on rolls and used as such for calender coating; or it can be extruded directly over metallic conductors to give them a flexible resistant coating. If a somewhat softer composition is desired it is sometimes advantageous to add about 10% of a plasticizer, such as tricresyl phosphate, at the time the fillers are incorporated.

In the above example para-phenyl phenol can be substituted in whole or in part in about the same proportions to give a resin of substantially the same properties.

*Example 6.*—A brittle, heat-reactive and oil-soluble resin is prepared by refluxing 100 parts of para butyl phenol with 150 parts 37% formaldehyde solution and 1 part barium hydroxide until resin separation occurs. The reaction mixture is then subjected to distillation under diminished pressure until a hard, brittle resin is obtained, when a test sample is dropped into water at 25° C. The resulting resin is light colored and softens at about 75 to 80° C. 100 parts of this resin are kneaded with 300 parts of blown fish oil at a temperature of 120 to 160° C. for about 4 hours, or until the composition has polymerized to a soft gel. At this point fillers, such as asbestine, clay, wood flour, cotton flock and the like, in the proportion of 1 part filler to 4 parts blown oil-resin composition are added along with suitable pigments, such as carbon black, titanium oxide, or suitable dyes. One or two per cent of a catalyst, such as litharge or a methylene-containing agent as, for example, hexamethylenetetramine or paraform which further accelerates the gelling, can be included.

The kneading of the resin and oil composition can be continued at 120° C. for another 2 hours or until the composition is converted to a dry, rubbery mass which can be sheeted on rolls. 100 parts of this material are then compounded with 100 parts of a fusible phenolic formaldehyde resin, that is, a novolak, and 100 parts of wood flour, and this is milled on differential rolls, heated to 80 to 125° C. for about 5 minutes or until a thorough mixing of the ingredients is obtained. On cooling, the brittle mass is ground to pass a 10 mesh screen and about 10 parts of this material are compounded with 90 parts of a molding mixture prepared from equal parts of the usual potentially reactive phenol-formaldehyde resin and wood flour. This composition can be molded under 1300 to 1500 lbs. per sq. in.

pressure and a temperature of 160° C. and discharged hot at the end of 1¼ minutes; yet it possesses about 50% more flow than a similar molding mixture containing none of the blown oil, heat-reactive resin composition.

Example 7.—150 parts of blown fish oil, 150 parts of blown soya bean oil, 100 parts of resin prepared as in Example 1 are kneaded together at 120 to 160° C. for about 2 to 3 hours or until the composition has polymerized to a dry, soft gel. 5 to 10 parts of the resulting material are compounded with 90 to 95 parts of a potentially heat-reactive phenolic resin wood flour molding mixture to give a molding compound of 40 to 50% increased flow, yet heat-hardenable in a standard molding cycle of 3 minutes at 150° C.

Example 8.—Blown linseed oil is heat-treated by heating to 290° C. during a course of 50 minutes. The oil is cooled to 25° C. 300 parts of this heat treated blown oil are reheated to 175° C., the heat removed and 100 parts of heat-reactive resin, prepared as in Example 1, are added and the mixture agitated until the resin has completely dispersed in oil. The temperature is then raised to 175° C. and then sufficient xylol added to give a solution containing 70% solids. This solution may be used as an impregnating compound.

Example 9.—100 parts of heat-reactive resin, prepared as in Example 1, are dissolved by refluxing in 100 parts of xylol. This resin solution is mixed with 300 parts of blown linseed oil, heat treated as in Example 8. The resulting solution can be used as an impregnating compound; for example, asbestos fiber such as used in brake linings may be impregnated and the impregnated lining hardened by heating to a temperature of 125° C. or higher for 1 to 2 hours, when polymerization of the binder is effected.

Example 10.—500 parts blown linseed oil are partially polymerized by heating to 260° C. during a course of 30 minutes and then held at this temperature for 1¾ hours. It is then cooled to 150° C. and 100 parts of resin, made as in Example 1, are then dispersed in this partially polymerized oil, this operation requiring about 5 to 10 minutes. Immediately after the resin has been thus dispersed, the mixture foams due to reaction of resin splitting off water and becomes more and more viscous and is completely polymerized in 10 to 20 minutes at 150° C. This material is a rubbery viscous mass but of a consistency to permit the incorporation of fillers and pigments. Such a composition is particularly adapted for the production of linoleum, without requiring the long time usually required for the hardening of linoxyn.

Example 11.—A composition suitable for floor covering is made according to Example 10, except 2000 parts of the partially polymerized blown linseed oil are combined with 100 parts of the heat-reactive oil-soluble resin. The resin is combined with the partially polymerized blown linseed oil and reacted in a kneader for 2 to 6 hours at 120 to 160° C. or until the mixture has polymerized to a soft rubbery mass. Fillers or pigments can then be incorporated and the material sheeted out on rolls to give a resilient plastic sheet.

As the examples bring out the blown oil-heat-reactive resin compositions of this invention are suitable for a wide variety of uses; in calendering masses for the coating of textiles; in floor covering compositions; for wire coatings highly resistant to gasoline, mineral oil and to the corona effect of high tension currents; as softening and flow promoting agents in molding compositions in which they are readily dispersed without absorption by the filler, thus acting as an efficient plasticizer to give increased flow without retarding the conversion of the molding mixture to the infusible state.

Dispersions of these blown oil-heat-reactive resin compositions in suitable solvents form highly effective impregnating compounds, since the heat-reactive character of the composition is retained in such dispersions, thus making it possible to impregnate fabrics for use in brake linings, in electrical insulation, to impregnate wood and similar porous substances, and then subsequently subject the impregnated object to heat. This results in a material which is impregnated with completely polymerized oil-resin binder which is free of surface oxidation and which retains its toughness and pliability almost indefinitely.

The blown oil-resin dispersions may also be used as coating compositions; and the film deposited will be tough and free of the objectionable aging characteristics common to rubber and to oil-resin compositions polymerized in the presence of siccative agents.

What is claimed is:

1. Process of preparing a composition convertible by heating to a rubber-like gel which comprises forming an oil-soluble heat-reactive condensation product of a phenol with an aqueous aldehyde in equimolecular or greater proportions and in the presence of not more than one-fifth mol. of a basic catalyst, said condensation product being in an intermediate stage of reaction with a melting point at or above 50° C. and a reactivity such as to set to a state where it does not melt at 160° C. when heated for a period of from one to ten minutes, and blending about two parts of the resin with from one to forty parts of a blown oil, the composition in the gel form being characterized by uniformity of hardness in film thicknesses in excess of two-thousandths of an inch.

2. Process according to claim 1 in which the phenol has a hydrocarbon radical as a substituent in the ortho or para position.

3. Process according to claim 1 in which the phenol is a tar acid fraction having a boiling point ranging from 225° C. to 250° C.

4. Process according to claim 1 in which the basic catalyst is present in amount equivalent to not more than two parts of ammonium hydroxide to 100 parts of phenol.

5. Process according to claim 1 in which the blown oil is subjected to a preliminary heat treatment.

6. Process according to claim 1 in which the resin is blended with the blown oil by means of heat.

7. Composition convertible to a rubber-like gel comprising in combination a blown oil and an oil-soluble heat-reactive condensation product of a phenol with an aqueous aldehyde in equimolecular or greater proportions and in the presence of not more than one-fifth mol. of a basic catalyst, said condensation product being in an intermediate stage of reaction with a melting point at or above 50° C. and a reactivity such as to set to a state where it does not melt at 160° C. when heated for a period of from one to ten minutes, said resin and said oil being blended in the proportions of from about two parts of the resin with from one to forty parts of the blown oil, and said composition in the converted gel form being characterized by a uniformity of hardness in film thicknesses in excess of two-thousandths of an inch.

8. Composition according to claim 7 in which the phenol has a hydrocarbon radical as a substituent in the ortho or para position.

9. Composition according to claim 7 in which the phenol is a tar acid fraction having a boiling point ranging from 225° C. to 250° C.

10. Composition according to claim 7 in which the basic catalyst is present in amount equivalent to not more than two parts of ammonium hydroxide to 100 parts of phenol.

11. Composition according to claim 7 in which the blown oil is partially polymerized.

12. Composition polymerizable to a rubber-like gel comprising an oxidized oil and an oil-soluble heat-reactive condensation product in the presence of a base in catalytic proportions of a phenol having a hydrocarbon radical as a substituent in the ortho or para position, said product having a heat-reactivity such that it hardens from a fusible state to a state where it does not melt when heated at 160° C. for one to ten minutes.

WILLIAM H. BUTLER.